J. S. NEEDHAM.

Insect-Destroyer.

No. 45,428. Patented Dec. 13, 1864.

Witnesses:
F R Hale Jr
J. F Linnihan

Inventor:
Joseph S Needham
by his attorney
R. H. Eddy

UNITED STATES PATENT OFFICE.

JOSEPH S. NEEDHAM, OF SOUTH DANVERS, MASSACHUSETTS.

INSTRUMENT FOR DESTROYING CATERPILLAR-NESTS.

Specification forming part of Letters Patent No. 45,428, dated December 13, 1864.

*To all whom it may concern:*

Be it known that I, JOSEPH S. NEEDHAM, of South Danvers, in the county of Essex and State of Massachusetts, have invented a new and useful Implement for Removing the Nests of Caterpillars from Trees; and I do hereby declare the same to be fully described in the following specification and represented in the accompanying drawings, of which—

Figure 1:
Figure 2:

Figure 1 is a side view, and Fig. 2 a longitudinal section, of it.

The invention in question is composed of a conical or tapering block of wood, A, and a covering, B, of card-clothing, such as is ordinarily used for carding wool, and which consists of a strip of leather having wire teeth inserted in and so as to project from it. The card-clothing is to be stretched on the wooden block B, with the leather next to the tapering surface of the block, and may be secured in place thereon by nails, wires, or cement, or other proper means. The implement so made is to have a hole or socket, a, formed axially in it, and opening out of its base, such socket being for the reception of the end of a pole to which the implement is to be applied when in use.

To use the implement, it is to be pushed end foremost into a caterpillar's nest and revolved therein, in which case it will extract or draw the nest away from the tree. By having the implement pointed and tapering, it can be inserted closely into the crotch or angle in which the nest is usually made, however acute such angle may be.

For removing the caterpillars and nest from the teeth of the implement, a common hand-card or a comb may be used. I prefer the card, as by means of it the work can be thoroughly and expeditiously effected.

The implement, when used, will not only receive the nest and its contents from the twig or branch, but should any of the worms be left behind they will be punctured by the wires, which in such case is sure death to them.

What I claim as my invention is—

The implement made substantially as and for the purpose hereinbefore explained.

JOSEPH S. NEEDHAM.

Witnesses:
 R. H. EDDY,
 J. F. LINNIHAN.